United States Patent
Ono et al.

(10) Patent No.: US 7,129,298 B2
(45) Date of Patent: Oct. 31, 2006

(54) TETRAFLUOROETHYLENE BASED RESIN MOLDING MATERIAL EXCELLENT IN HIGH FREQUENCY ELECTRIC CHARACTERISTICS

(75) Inventors: Makoto Ono, Settsu (JP); Michio Asano, Settsu (JP); Yoshinori Nanba, Settsu (JP); Shunji Kasai, Settsu (JP); Hiroyuki Yoshimoto, Settsu (JP); Shinichi Yano, Settsu (JP); Tetsuo Shimizu, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 116 days.

(21) Appl. No.: 10/333,821

(22) PCT Filed: Aug. 2, 2001

(86) PCT No.: PCT/JP01/06652

§ 371 (c)(1),
(2), (4) Date: Jan. 27, 2003

(87) PCT Pub. No.: WO02/12392

PCT Pub. Date: Feb. 14, 2002

(65) Prior Publication Data

US 2004/0236047 A1 Nov. 25, 2004

(30) Foreign Application Priority Data

Aug. 3, 2000 (JP) .............................. 2000-236095

(51) Int. Cl.
*C08F 14/26* (2006.01)
(52) U.S. Cl. ...................... 525/276; 526/247; 526/252; 428/421; 174/36
(58) Field of Classification Search ................ 525/276; 526/247, 252
See application file for complete search history.

(56) References Cited

U.S. PATENT DOCUMENTS

| 3,380,974 | A | | 4/1968 | Stilmar | |
|---|---|---|---|---|---|
| 3,526,614 | A | | 9/1970 | Schindler | |
| 4,029,868 | A | * | 6/1977 | Carlson | 526/247 |
| 4,840,998 | A | * | 6/1989 | Shimizu et al. | 525/276 |
| 4,952,636 | A | * | 8/1990 | Morgan et al. | 525/276 |
| 5,461,129 | A | * | 10/1995 | Kurihara et al. | 526/247 |
| 5,463,006 | A | * | 10/1995 | Abusleme et al. | 526/247 |
| 6,011,113 | A | * | 1/2000 | Konabe | 524/805 |
| 6,114,448 | A | * | 9/2000 | Derbes | 525/104 |
| 6,503,988 | B1 | * | 1/2003 | Kitahara et al. | 525/326.2 |
| 6,599,626 | B1 | * | 7/2003 | Cogen et al. | 428/379 |
| 6,737,165 | B1 | * | 5/2004 | Smith et al. | 428/422 |

FOREIGN PATENT DOCUMENTS

| JP | 37-4643 | | 6/1962 |
|---|---|---|---|
| JP | 63-56532 | | 3/1988 |
| JP | 0257644 | A2 * | 3/1988 |
| JP | 2-220389 | | 9/1990 |
| JP | 7-272801 | | 10/1995 |
| WO | WO 96/00654 | | 1/1996 |

OTHER PUBLICATIONS

International Search Report for PCT/JP01/06652 dated Nov. 6, 2001.
English translation of International Preliminary Examination Report for PCT/JP01/06652 dated Aug. 29, 2002.
Supplementary European Search Report for EP 01 95 6789 dated Feb. 4, 2004.

* cited by examiner

*Primary Examiner*—David W. Wu
*Assistant Examiner*—Henry S. Hu
(74) *Attorney, Agent, or Firm*—Sughrue Mion, PLLC

(57) ABSTRACT

The present invention provides a TFE resin molding material which has electric characteristics, particularly low dielectric dissipation factor, in a microwave area, can also lower extrusion pressure as the material is of low molecular weight and can provide a molded article excellent in surface smoothness. The material is especially useful as a coating material for a coaxial cable for equipment in which microwave is used, including satellite transmitting equipment and a cell phone base station. A tetrafluoroethylene resin molding material excellent in high frequency electric characteristics, which provides a molded article having a dielectric constant of at most 2.2 and a dielectric dissipation factor of at most $1.60 \times 10^{-4}$ under 12 GHz, and a standard specific gravity of at least 2.192 and less than 2.3 is provided. As the tetrafluoroethylene resin, a tetrafluoroethylene homopolymer or a copolymer of 99.9 to 99.9999% by mole of tetrafluoroethylene and 0.0001 to 0.1% by mole of a specific fluoromonomer is used.

6 Claims, No Drawings

TETRAFLUOROETHYLENE BASED RESIN MOLDING MATERIAL EXCELLENT IN HIGH FREQUENCY ELECTRIC CHARACTERISTICS

TECHNICAL FIELD

The present invention relates to a molding material comprising a tetrafluoroethylene resin, excellent in various electric characteristics in a high frequency range of 3 to 30 GHz, as well as in extrusion moldability, and molded article using the same.

BACKGROUND ART

The progress of communication means using electric waves has been amazing. For the electric waves, a high frequency area tends to be used more and more, as the amount of information transmitted increases. For example, a UHF (ultra high frequency) of up to a frequency of 300 MHz is used for wireless LAN (local access network) and cell phones. However for high frequency wireless LAN, satellite communication and cell phone base stations, which will be the center of future development, microwaves of 3 to 30 GHz are used.

In the case of using these high frequency waves, electric characteristics such as stable low dielectric constant ($\epsilon_r$) and a low dielectric dissipation factor (tan δ), facilitated process moldability, and also heat resistance which can resist plating and soldering are desired for the material of parts used for the telecommunications equipment such as electric parts including a connector, casing and coaxial cable. Therefore conventionally, fluorine resin excellent in electric characteristics are used.

Examples of the fluorine resin used in telecommunications equipment are, in addition to polytetrafluoroethylene (PTFE) which cannot be melt-processed, a tetrafluoroethylene (TFE) hexafluoropropylene (HFP) copolymer (FEP: containing at least 6.9% by mole of HFP) and a TFE-perfluoro(alkyl vinyl ether) (PAVE) copolymer (PFA: containing at least 1.5% by mole of PAVE), which can be melt-processed.

As a result of going through research to improve high frequency electric characteristics in a microwave area, especially lowering the dielectric dissipation factor, and also to improve molding processability, the present inventors discovered that by using a TFE homopolymer (hereinafter "PTFE") or a copolymer obtained by copolymerizing TFE and a slight amount of a fluorine monomer (hereinafter "modified PTFE") which is greater in standard specific gravity, in other words by lowering the molecular weight of the PTFE or the modified PTFE, the dielectric dissipation factor can be lowered and furthermore that the PTFE or the modified PTFE has acceptable molding processability.

DISCLOSURE OF INVENTION

That is, the present invention relates to a tetrafluoroethylene resin molding material excellent in high frequency electric characteristics, which provides a molded article having a dielectric constant of at most 2.2 and a dielectric dissipation factor of at most $2.0 \times 10^{-4}$ under 12 GHz, and a standard specific gravity of at least 2.192 and less than 2.3.

It is preferable that the material provides a molded article having a standard specific gravity of at least 2.200 and less than 2.280.

It is preferable that the TFE resin comprises a TFE homopolymer (PTFE) or a copolymer (modified PTFE) of 99.9 to 99.9999% by mole of TFE and 0.0001 to 0.1% by mole of at least one monomer selected from the group consisting of fluoroolefins represented by the formula (I):

$$CX_2=CY(CF_2)_nZ \qquad (I)$$

(in which each of X, Y and Z is the same or different, a hydrogen atom or a fluorine atom, and n is an integer of 1 to 5)

and a perfluoro(alkyl vinyl ether) (PAVE) represented by the formula (II):

$$CF_2=CF-OR^f \qquad (II)$$

(in which $R^f$ is a perfluoroalkyl group having 1 to 3 carbon atoms), and the PTFE or modified PTFE is in an agglomeration of colloid particles having a number average primary particle size of 0.05 to 0.5 μm.

It is preferable that the tetrafluoroethylene resin comprises a first particle having a core-shell structure, the particle core being a tetrafluoroethylene homopolymer or a copolymer of 99.9 to 99.9999% by mole of tetrafluoroethylene and 0.0001 to 0.1% by mole of hexafluoropropylene or perfluoro(methyl vinyl ether), and the particle shell being a tetrafluoroethylene homopolymer or a copolymer of 99.9 to 99.999% by mole of tetrafluoroethylene and 0.001 to 0.1% by mole of hexafluoropropylene.

The present invention also relates to a TFE resin molded article excellent in high frequency electric characteristics, obtained by molding the material.

Furthermore, the present invention relates to a TFE resin molded article having a large specific gravity, obtained by molding the material, sintering, and gradually cooling after sintering at a cooling speed of at most 20° C./minute.

In addition, the present invention relates to a high frequency coaxial cable made by coating with the material.

BEST MODE FOR CARRYING OUT THE INVENTION

The TFE resin molding material of the present invention which provides low dielectric constant and dielectric dissipation factor, is PTFE or modified PTFE and provides a molded article having a standard specific gravity of at least 2.192, preferably at least 2.200 and less than 2.3, in particular less than 2.280. A molded article having a standard specific gravity of 2.3 is composed of completely crystallized PTFE and does not exist in reality. Consequently, the PTFE or modified PTFE used in the present invention provides a molded article of high crystallinity.

In the TFE resin (PTFE and modified PTFE), mechanical properties such as strength are superior and molding processability inferior, the lower the standard specific gravity is. On the other hand, there is the problem of mechanical strength diminishing when the standard specific gravity is high.

In the present invention, electric characteristics, especially dielectric dissipation factor are intensively studied, and the extent of acceptable mechanical strength has been investigated in the molding material for the coaxial cable used in a microwave area, in which the dielectric dissipation factor is most influential. From this, a low molecular weight TFE resin which provides high crystallinity and mechanical strength within an acceptable range was found.

Measuring the molecular weight of PTFE and modified PTFE is extremely difficult, owing to properties such as difficulty in dissolving in a solvent and a lack of flowability when melting. Furthermore, because unevenness and errors are large according to the difference in measurement methods, definition was made by using the standard specific gravity (ASTM D4895-89) which can more clearly specify the characteristics of the present invention. Consequently, the standard specific gravity does not necessarily correspond with the molecular weight in the prior art documents. Though varying according to the crystallization processing (the way of sintering and cooling), it is considered that a standard specific gravity of 2.192 is the equivalent of number average molecular weight of approximately 3,300,000 and a standard specific gravity of 2.200 is the equivalent of number average molecular weight of approximately 1,800,000.

As the TFE resin of the present invention, modified PTFE, more specifically a copolymer obtained by copolymerizing 99.9 to 99.9999% by mole, more preferably 99.99 to 99.9999% by mole, of TFE and 0.0001 to 0.1% by mole, more preferably 0.0001 to 0.01% by mole, of at least one fluorine monomer represented by the formula (I) or (II), can also preferably be used in addition to PTFE. This TFE resin is a resin that cannot be melt-processed.

Examples of the fluoroolefin represented by the formula (I) are, for example, perfluoroolefins such as hexafluoropropylene (HFP) and fluoroolefins such as perfluorobutylethylene. Among these, HFP is preferred from the viewpoint of superior electric characteristics.

Examples of the perfluoro(alkyl vinyl ether) represented by the formula (II) are perfluoro(methyl vinyl ether) (PMVE), perfluoro(ethyl vinyl ether) (PEVE) and perfluoro(propyl vinyl ether) (PPVE). Among these, PMVE is preferred from the viewpoint of superior electric characteristics.

The number average primary particle size of the aforesaid tetrafluoroethylene homopolymer or the aforesaid copolymer is preferably 0.05 to 0.5 µm, more preferably 0.1 to 0.4 µm. When the number average primary particle size of the aforesaid polymer is less than 0.05 µm, the extrusion pressure when molding becomes high, and moldability tends to become inferior. When the number average primary particle size of the aforesaid polymer exceeds 0.5 µm, the auxiliary has difficulty penetrating and extrusion unevenness tends to be generated.

Furthermore, by giving the colloid first particles obtained by emulsion polymerization a core-shell structure, moldability, particularly moldability in paste extrusion, can also be improved.

The PTFE or modified PTFE used in the present invention can be obtained by emulsion dispersion polymerization using a polymerization initiator in the presence of an emulsifier, particularly a fluorine-containing emulsifier. In order to lower the molecular weight of the obtained polymer, methods such as increasing the amount of the polymerization initiator, adding a chain transfer agent and adding a modified monomer are adopted. Examples of the polymerization initiator are ammonium persulfate (APS) and disuccinic acid peroxide (DSP), and examples of the chain transfer agent are hydrocarbons such as methane, ethane, propane and butane and water-soluble compounds such as methanol and ethanol.

Because the material of the present invention cannot be melt-processed, the material is mold-processed by molding methods such as paste extrusion molding method, ram extrusion molding method and compression molding method.

The obtained molded article is then generally sintered. A sintering temperature of 360 to 400° C. is appropriate. After sintering, the molded article can be left in the air to be cooled, but by gradually cooling at a cooling speed of at most 20° C./minute until at least 250° C., the standard specific gravity is increased to at least 2.192 and a molded article with low dielectric dissipation factor is obtained. The cooling speed is preferably at most 1° C./minute.

The molded article of the present invention obtained in this way is excellent in electric characteristics in a microwave area (3 to 30 GHz), and the dielectric constant under 12 GHz is at most 2.2. The aforesaid dielectric constant is preferably at most 2.15, more preferably at most 2.0. When the dielectric constant exceeds 2.2, the transmission delay time becomes long. Also, under 12 GHz, the dielectric dissipation factor is at most $2.0 \times 10^{-4}$. It is preferable that the aforesaid dielectric dissipation factor is at most $1.6 \times 10^{-4}$. When the dielectric dissipation factor exceeds $2.0 \times 10^{-4}$, the dielectric loss becomes large.

In the present invention, a cavity resonance method is used as the measuring method for dielectric constant and dielectric dissipation factor. When the samples are subjected to measurement using a cavity resonance method, though the resonance frequency decreases, the dielectric constant and the dielectric dissipation factor obtained in this way are generally noted as a value obtained in a frequency under no load.

The molded article of the present invention can also be used in a millimetric wave area exceeding 30 GHz, and needless to say, can also be used in a UHF (ultra high frequency) area of less than 3 GHz.

The shape of the molded article is not particularly limited but the molding material is useful as coating material for a coaxial cable, for which dielectric loss is the most problematic and superior paste extrusion moldability is demanded. It is also suitable for a connector and a printed wiring board which require soldering. The TFE resin molded article of the present invention has the same heat resistance as PTFE and therefore heat resistance in soldering is not a problem.

The TFE resin used in the present invention is preferably an agglomeration of colloid particles obtained by emulsion dispersion polymerization, but may also be in the form of an aqueous dispersion body, which is produced by concentrating and stabilizing the aqueous dispersion of the colloid particles obtained by polymerization. In this case, the aqueous dispersion body can be impregnated into glass cloth and suitably be used, for example, as material for preparing printed wiring board.

Hereinafter, the present invention is explained in detail by means of examples, but is not limited thereto.

In Examples, properties were measured according to the following methods.

(Calculation of TFE/HFP Molar Ratio)

Gas was collected from the gas phase in the autoclave each time immediately after the polymerization was started, the core was formed, HFP was added to the shell, and the shell was formed. By using gas chromatograph (GC-14B made by Shimadzu Corporation) each of the collected gas was analyzed, and TFE/HFP molar ratio in each gas was calculated from the proportion of the obtained peak areas of TFE and HFP.

The molar quantity of HFP consumption in the core was found from the difference in TFE/HFP molar ratios obtained immediately after the polymerization was started and immediately after the core was formed. In the same manner, the molar quantity of HFP consumption in the shell was found from the difference in TFE/HFP molar ratios obtained immediately after HFP was added to the shell and immediately after the shell was formed. The value obtained by dividing the total molar quantity of TFE consumed in the polymerization by the sum of molar quantities of HFP consumption in the core and the shell was assumed be the TFE/HFP molar ratio.

(Calculation of TFE/PMVE Molar Ratio)

When the polymerization was completed, 0.5 ml of gas was collected from the gas phase, and an attempt was made to find TFE/PMVE molar ratio by using gas chromatograph (GC-14B made by Shimadzu Corporation). However, peaks corresponding to PMVE were not detected, which shows that all of PMVE charged at the beginning of the polymerization had reacted.

Accordingly, the value obtained by dividing the molar quantity of TFE consumed in the polymerization by the molar quantity of PMVE charged at the beginning of the polymerization was assumed to be the TFE/PMVE molar ratio.

(Number Average Primary Particle Size of Colloid Particles)

The number average primary particle size of colloid particles was determined for each sample by using an analytical curve and the permeability of projected light of 550 nm per the unit length of the latex of TFE polymer diluted with water to be solid content of 0.15% by weight. The analytical curve was obtained by measuring the standard number average particle size in a fixed direction in a transmission electron microscope micrograph.

(Standard Specific Gravity)

The standard specific gravity was measured by water displacement method using samples prepared in accordance with ASTM D4895-89.

(Dielectric Constant and Dielectric Dissipation Factor)

Coagulated powder (fine powder) of TFE polymer was subjected to compression molding to prepare a cylindrical bar, and the bar was cut into 0.5 mm-thick films. The obtained films were sintered at 380° C. for 5 minutes, and after sintering the films were gradually cooled to 250° C. at a cooling rate of 1° C./minute, maintained at 250° C. for 5 minutes, and then cooled to room temperature. By using a network analyzer (HP8510 made by Hewlett-Packard Co.), the change in resonance frequency and Q values of this sintered TFE molded article was measured with a cavity resonator, and the dielectric constant ($\epsilon_r$) and dielectric dissipation factor (tan δ) at 12 GHz were calculated.

The equations for calculating the dielectric constant ($\epsilon_r$) and dielectric dissipation factor (tan δ) are as follows:

$$\epsilon_r = \frac{(f_O - f_L)}{f_L} \times \frac{(H + L)}{L} + 1$$

$$\tan\delta = \left(\frac{1}{Q_L} - \frac{1}{Q_O}\right) \times \frac{H}{2L} \times \frac{1}{\epsilon_r}$$

in which $$Q_O = \frac{f_O}{f_{O1} - f_{O2}}, \quad Q_L = \frac{f_L}{f_{L1} - f_{L2}}$$

In the formula,
$f_O$: resonance frequency under no load
$f_L$: resonance frequency when sample is set
H: depth of the cavity resonator
L: thickness of sample
$f_{O1}$: upper frequency at which the decrease from resonance point under no load is 3 dB
$f_{O2}$: lower frequency at which the decrease from resonance point under no load is 3 dB
$f_{L1}$: upper frequency at which the decrease from resonance point in the case of setting the sample is 3 dB
$f_{L2}$: lower frequency at which the decrease from resonance point in the case of setting the sample is 3 dB (Extrusion Pressure)

An extruder equipped with an extrusion die (reduction angle: 30 degrees, an orifice of a diameter of 0.95 mm and a land length of 2.0 mm being attached at the lower part) with a cylinder (inner diameter: 25.4 mm) was used.

First, 50 g of agglomerated powder of TFE copolymer (fine powder) was mixed with 10.6 g of hydrocarbon oil (IP 1620 available from Idemitsu Petrochemical Co., Ltd.) in a glass bottle, and the mixture was aged at room temperature (25±2° C.) for an hour.

Second, the cylinder of the extruder was charged with the above mixture. A load of 5.7 MPa was applied to the piston which was inserted into the cylinder, and the mixture was maintained for a minute and immediately extruded through the orifice at room temperature at a ram speed of 20 mm/minute. The value obtained by dividing the pressure (N) at the moment when the pressure reaches an equilibrium state during the latter half of the extrusion step by the cross section area of the cylinder was assumed to be the extrusion pressure (MPa).

EXAMPLE 1

A 6 l stainless steel autoclave equipped with a stainless steel anchor stirrer and a temperature adjusting jacket was charged with 2,960 ml of deionized water, 120 g of paraffin wax and 4.4 g of ammonium perfluorooctanoate, and oxygen was removed by replacing the system with nitrogen gas 3 times and TFE gas twice while heating to 85° C. To the system was added 10 ml of HFP, and TFE gas was additionally introduced so that the pressure within the system becomes 0.74 MPa. The inner temperature was maintained at 85° C. with stirring at a rate of 250 rpm.

An aqueous solution of 477 mg of disuccinic acid peroxide dissolved in 20 ml of water was fed with pressurized TFE into the autoclave. Furthermore, an aqueous solution of 30 mg of ammonium persulfate dissolved into 20 ml of water was fed with pressurized TFE into the autoclave. The pressure within the autoclave was raised to 0.78 MPa and the polymerization reaction was started. The pressure within the system declines as the polymerization reaction progresses, and so TFE was introduced to maintain the pressure at 0.78±0.05 MPa. The stirring speed was maintained at 250 rpm and the reaction temperature was maintained at 85° C.

At the point when 1,170 g of TFE was consumed (the formation of the core), 20 ml of ethane gas as a chain transfer agent was added, and polymerization was carried on while continuously supplying TFE to form the copolymer of the shell. At the point when 1,300 g of TFE was consumed (13.7 hours after the start of the reaction), stirring and supplying of TFE was stopped. The gas within the autoclave was immediately discharged to finish the reaction and latex of the TFE polymer was obtained (polymer concentration: 30.2% by weight). The number average primary particle size of the colloid particles within the latex was 0.28 μm, and the composition of the copolymer was TFE/HFP=99.9970/0.0030 (molar ratio).

An agglomeration of resin colloid particles was obtained by coagulating and then washing the latex by the usual method. Furthermore, drying was carried out for 18 hours at 130° C. and TFE resin powder was obtained.

Using the obtained TFE resin powder, the extrusion pressure in extrusion molding was measured as defined above. As a result, consecutive extrusion beads were obtained at an extrusion pressure of 23.5 MPa. The obtained beads were heated and sintered in an electric oven for 60 minutes at 380° C. Immediately, the beads were then drawn out into air of room temperature (25° C.) and were left to cool to room temperature at a cooling speed of 1° C./minute to obtain the molded article.

The standard specific gravity (SSG), and the dielectric constant ($\epsilon_r$) and dielectric dissipation factor (tan δ) under 12 GHz of the molded article of the TFE polymer powder, measured as defined above, were respectively 2.216, 2.12 and $1.42 \times 10^{-4}$.

EXAMPLE 2

Latex of TFE polymer was obtained in the same manner as in Example 1 except that 714 mg of disuccinic acid peroxide and 45 mg of ammonium persulfate were used.

The concentration of the TFE polymer in the latex was approximately 30.1% by weight, the number average primary particle size of the colloid particles within the latex was 0.28 μm and the composition of the copolymer was TFE/HFP=99.9970/0.0030 (molar ratio).

An agglomeration of resin colloid particles was obtained by coagulating and then washing the latex by the usual method. TFE resin powder was obtained by drying for 18 hours at 130° C.

Using the obtained TFE resin powder, the extrusion pressure in extrusion molding was measured as defied above. As a result, consecutive extrusion beads were obtained at an extrusion pressure of 20.8 MPa. The obtained beads were heated and sintered in an electric oven for 60 minutes at 380° C. Immediately, the beads were then drawn out into air of room temperature (25° C.) and were left to cool to room temperature at a cooling speed of 1° C./minute to obtain the molded article.

The standard specific gravity (SSG), and the dielectric constant ($\epsilon_r$) and dielectric dissipation factor (tan δ) under 12 GHz of the molded article of the TFE polymer powder, measured as defined above, were respectively 2.226, 2.12 and $1.39 \times 10^{-4}$.

EXAMPLE 3

A 6 l stainless steel autoclave equipped with a stainless steel anchor stirrer and a temperature adjusting jacket was charged with 2,960 ml of deionized water, 120 g of paraffin wax and 4.4 g of ammonium perfluorooctanoate, and oxygen was removed by replacing the system with nitrogen gas 3 times and TFE gas twice while heating to 85° C. To the system was added 10 ml of HFP, and TFE gas was additionally introduced so that the pressure within the system becomes 0.74 Mpa. The inner temperature was maintained at 85° C. with stirring at a rate of 250 rpm.

An aqueous solution of 477 mg of disuccinic acid peroxide dissolved in 20 ml of water was fed with pressurized TFE into the autoclave. Furthermore, an aqueous solution of 30 mg of ammonium persulfate dissolved into 20 ml of water was fed with pressurized TFE into the autoclave. The pressure within the autoclave was raised to 0.78 MPa and the polymerization reaction was started. The pressure within the system declines as the polymerization reaction progresses, and so TFE was introduced to maintain the pressure at 0.78±0.05 MPa. The stirring speed was maintained at 250 rpm and the reaction temperature was maintained at 85° C.

At the point when 1,173 g of TFE was consumed (the formation of the core), 20 ml of ethane gas as a chain transfer agent and 65 ml of HFP gas were added, and polymerization was carried on while continuously supplying TFE to form the copolymer of the shell. At the point when 1,300 g of TFE was consumed, stirring and supplying of TFE was stopped. The gas within the autoclave was immediately discharged to finish the reaction and latex of the TFE polymer was obtained (polymer concentration: 31.6% by weight). The number average primary particle size of the colloid particles within the latex was 0.28 μm, and the composition of the copolymer was TFE/HFP=99.9970/0.0030 (molar ratio) in the core and TFE/HFP=99.9840/0.0160 (molar ratio) in the shell.

An agglomeration of resin colloid particles was obtained by coagulating and then washing the latex by the usual method. Furthermore, drying was carried out for 18 hours at 130° C. and TFE resin powder was obtained.

Using the obtained TFE resin powder, the extrusion pressure in extrusion molding was measured in the same manner as in Example 1. As a result, consecutive extrusion beads were obtained at an extrusion pressure of 21.9 MPa. The obtained beads were heated and sintered in an electric oven for 60 minutes at 380° C. Immediately, the beads were then drawn out into air of room temperature (25° C.) and were left to cool to room temperature at a cooling speed of 1° C./minute to obtain the molded article.

Furthermore the standard specific gravity (SSG), and the dielectric constant ($\epsilon_r$) and dielectric dissipation factor (tan δ) under 12 GHz of the molded article of the TFE polymer powder, measured in the same manner as in Example 1, were respectively 2.208, 2.12 and $1.47 \times 10^{-4}$.

EXAMPLE 4

Latex of TFE polymer was obtained in the same manner as in Example 3 except that 4,714 mg of disuccinic acid peroxide and 45 mg of ammonium persulfate were used.

The concentration of the TFE polymer in the latex was approximately 30.4% by weight, the number average primary particle size of the colloid particles within the latex was 0.29 μm and the composition of the copolymer was TFE/HFP=99.9970/0.0030 (molar ratio) in the core and TFE/HFP=99.9790/0.0210 (molar ratio) in the shell.

An agglomeration of resin colloid particles was obtained by coagulating and then washing the latex by the usual method. Furthermore, drying was carried out for 18 hours at 130° C. and TFE resin powder was obtained.

Using the obtained TFE resin powder, the extrusion pressure in extrusion molding was measured as defined above. As a result, consecutive extrusion beads were obtained at an extrusion pressure of 18.4 MPa. The obtained beads were heated and sintered in an electric oven for 60 minutes at 380° C. Immediately, the beads were then drawn out into air of room temperature (25° C.) and were left to cool to room temperature at a cooling speed of 1° C./minute to obtain the molded article.

Furthermore, the standard specific gravity (SSG), and the dielectric constant ($\epsilon_r$) and dielectric dissipation factor (tan δ) under 12 GHz of the molded article of the TFE polymer powder, measured as defined above, were respectively 2.220, 2.12 and 1.40×10$^{-4}$.

COMPARATIVE EXAMPLE 1

A 6 l stainless steel autoclave equipped with a stainless steel anchor stirrer and a temperature adjusting jacket was charged with 2,960 ml of deionized water, 120 g of paraffin wax and 4.4 g of ammonium perfluorooctanoate, and oxygen was removed by replacing the system with nitrogen gas 3 times and TFE gas twice while heating to 85° C. To the system was added 10 ml of HFP, and TFE gas was additionally introduced so that the pressure within the system becomes 0.74 MPa. The inner temperature was maintained at 85° C. with stirring at a rate of 250 rpm.

An aqueous solution of 243 mg of disuccinic acid peroxide dissolved in 20 ml of water was fed with pressurized TFE into the autoclave. Furthermore, an aqueous solution of 15 mg of ammonium persulfate dissolved into 20 ml of water was fed with pressurized TFE into the autoclave. The pressure within the autoclave was raised to 0.78 MPa and the polymerization reaction was started. The pressure within the system declines as the polymerization reaction progresses, and so TFE was introduced to maintain the pressure at 0.78±0.05 MPa. Also, the stirring speed was maintained at 250 rpm and the reaction temperature was maintained at 85° C.

At the point when 1,179 g of TFE was consumed (the formation of the core), 10 ml of ethane gas as a chain transfer agent and 65 ml of HFP gas were added, and polymerization was carried on while continuously supplying TFE to form the copolymer of the shell. At the point when 1,335 g of TFE was consumed, stirring and supplying of TFE was stopped. The gas within the autoclave was immediately discharged to finish the reaction and latex of the TFE polymer was obtained (polymer concentration: 30.8% by weight). The number average primary particle size of the colloid particles within the latex was 0.29 μm, and the composition of the copolymer was TFE/HFP=99.9970/0.0030 (molar ratio) in the core and TFE/HFP=99.981/0.019 (molar ratio) in the shell.

An agglomeration of resin colloid particles was obtained by coagulating and then washing the latex by the usual method. Furthermore, drying was carried out for 18 hours at 130° C. and TFE resin powder was obtained.

Using the obtained TFE resin powder, the extrusion pressure in extrusion molding was measured in the same manner as in Example 1. As a result, consecutive extrusion beads were obtained at an extrusion pressure of 28.8 MPa. The obtained beads were heated and sintered in an electric oven for 60 minutes at 380° C. Immediately, the beads were drawn out into air of room temperature (25° C.) and were left to cool to room temperature at a cooling speed of 1° C./minute to obtain the molded article.

Furthermore, the standard specific gravity (SSG), and the dielectric constant ($\epsilon_r$) and dielectric dissipation factor (tan δ) under 12 GHz of the molded article of the TFE polymer powder, measured in the same manner as in Example 1, were respectively 2.185, 2.12 and 1.66×10$^{-4}$.

COMPARATIVE EXAMPLE 2

A 6 l stainless steel autoclave equipped with a stainless steel anchor stirrer and a temperature adjusting jacket was charged with 2,960 ml of deionized water, 120 g of paraffin wax and 4.4 g of ammonium perfluorooctanoate, and oxygen was removed by replacing the system with nitrogen gas 3 times and TFE gas twice while heating to 85° C. To the system was added 500 ml of HFP, and TFE gas was additionally introduced so that the pressure within the system becomes 0.74 MPa. The inner temperature was maintained at 85° C. with stirring at a rate of 250 rpm.

An aqueous solution of 180 mg of disuccinic acid peroxide dissolved in 20 ml of water was fed with pressurized TFE into the autoclave. Furthermore, an aqueous solution of 11 mg of ammonium persulfate dissolved into 20 ml of water was also fed with pressurized TFE into the autoclave. The pressure within the autoclave was raised to 0.78 MPa and the polymerization reaction was started. The pressure within the system declines as the polymerization reaction progresses, and so TFE was introduced to maintain the pressure at 0.78±0.05 MPa. Also, the stirring speed was maintained at 250 rpm to maintain a reaction temperature of 85° C.

At the point when 1,152 g of TFE was consumed (the formation of the core), 20 ml of ethane gas as a chain transfer agent and 65 ml of HFP gas were added, and polymerization was carried on while continuously supplying TFE to form the copolymer of the shell. At the point when 1,296 g of TFE was consumed, stirring and supplying of TFE was stopped. The gas within the autoclave was immediately discharged to finish the reaction and latex of the TFE polymer was obtained (polymer concentration: 30.2% by weight). The number average primary particle size of the colloid particles within the latex was 0.30 μm, and the composition of the copolymer was TFE/HFP=99.8890/0.1110 (molar ratio) in the core and TFE/HFP=99.8680/0.1320 (molar ratio) in the shell.

An agglomeration of resin colloid particles was obtained by coagulating and then washing the latex by the usual method. Furthermore, drying was carried out for 18 hours at 130° C. and TFE resin powder was obtained.

Using the obtained TFE resin powder, the extrusion pressure in extrusion molding was measured in the same manner as in Example 1. As a result, consecutive extrusion beads were obtained at an extrusion pressure of 31.1 MPa. The obtained beads were heated and sintered in an electric oven for 60 minutes at 380° C. Immediately, the beads were drawn out into air of room temperature (25° C.) and were left to cool to room temperature at a cooling speed of 1° C./minute to obtain the molded article.

Furthermore, the standard specific gravity (SSG), and the dielectric constant ($\epsilon_r$) and dielectric dissipation factor (tan δ) under 12 GHz of the molded article of the TFE polymer powder, measured in the same manner as in Example 1, were respectively 2.187, 2.11 and 1.75×10$^{-4}$.

COMPARATIVE EXAMPLE 3

A 6 l stainless steel autoclave equipped with a stainless steel anchor stirrer and a temperature adjusting jacket was charged with 2,960 ml of deionized water, 120 g of paraffin wax and 4.4 g of ammonium perfluorooctanoate, and oxygen was removed by replacing the system with nitrogen gas 3 times and TFE gas twice while heating to 85° C. To the system was added 2 ml of PMVE and TFE gas was additionally introduced so that the pressure within the system becomes to 0.74 MPa. The inner temperature was maintained at 85° C. with stirring at a rate of 250 rpm.

An aqueous solution of 954 mg of disuccinic acid peroxide dissolved in 20 ml of water was fed with pressurized TFE into the autoclave. Furthermore, an aqueous solution of 60 mg of ammonium persulfate dissolved in 20 ml of water was fed with pressurized TFE into the autoclave. The pressure within the autoclave was raised to 0.78 MPa and the polymerization reaction was started. The pressure within the system declines as the polymerization reaction progresses, and so TFE was introduced to maintain the pressure at 0.78±0.05 MPa. Also, the stirring speed was maintained at 250 rpm and the reaction temperature was maintained to 85° C.

At the point when 1, 173 g of TFE was consumed (the formation of the core), 20 ml of ethane gas as a chain transfer agent and 65 ml of HFP gas were added, and polymerization was carried on while continuously supplying TFE to form the copolymer of the shell. At the point when 1,300 g of TFE was consumed, stirring and supplying of TFE was stopped. The gas within the autoclave was immediately discharged to finish the reaction and latex of the TFE polymer was obtained (polymer concentration: 30.1% by weight). The number average primary particle size of the colloid particles within the latex was 0.27 μm, and the composition of the copolymer was TFE/HFP=99.9993/0.0007 (molar ratio) in the core and TFE/HFP=99.9770/0.0230 (molar ratio) in the shell.

An agglomeration of resin colloid particles was obtained by coagulating and then washing the latex by the usual method. Furthermore, drying was carried out for 18 hours at 130° C. and TFE resin powder was obtained.

Using the obtained TFE resin powder, the extrusion pressure in extrusion molding was measured in the same manner as in Example 1. As a result, consecutive extrusion beads were obtained at an extrusion pressure of 16.7 MPa. The obtained beads were heated and sintered in an electric oven for 60 minutes at 380° C. Immediately, the beads were drawn out into air of room temperature (25° C.) and were left to cool to room temperature at a cooling speed of 1° C./minute to obtain the molded article.

Furthermore, the standard specific gravity (SSG), and the dielectric constant ($\epsilon_r$) and dielectric dissipation factor (tan δ) under 12 GHz of the molded article of the TFE polymer powder, measured in the same manner as in Example 1, were respectively 2.131, 2.14 and $1.38\times10^{-4}$.

INDUSTRIAL APPLICABILITY

The TFE resin molding material of the present invention has electric characteristics, particularly low dielectric dissipation factor, in a microwave area of 3 to 30 GHz, can also lower extrusion pressure as the material is of low molecular weight and can provide a molded article excellent in surface smoothness. Therefore, it is especially useful as a coating material for a coaxial cable for equipment in which microwave is used, including satellite transmitting equipment and a cell phone base station.

The invention claimed is:

1. A high frequency coaxial cable made by coating with a molded article of tetrafluoroethylene resin wherein the molded article is excellent in high frequency electric characteristics and has:
   a dielectric constant of at most 2.2
   and a dielectric dissipation factor of at most $2.0\times10^{-4}$ under 12 GHz,
   and a standard specific gravity of at least 2.192 and less than 2.3.

2. The high frequency coaxial cable of claim 1, which provides a molded article having a standard specific gravity of at least 2.200 and less than 2.280.

3. The high frequency coaxial cable of claim 1, wherein said tetrafluoroethylene resin comprises:
   a tetrafluoroethylene homopolymer or
   a copolymer of 99.9 to 99.9999% by mole of tetrafluoroethylene and 0.0001 to 0.1% by mole of at least one monomer selected from the group consisting of fluoroolefins represented by the formula (I):

$$CX_2=CY(CF_2)_nZ \qquad (I)$$

(in which each of X, Y and Z is the same or different and either a hydrogen atom or a fluorine atom, n is an integer of 1 to 5)
   and a perfluoro(alkyl vinyl ether) represented by the formula (II):

$$CF_2=CF-OR^f \qquad (II)$$

(in which $R^f$ is a perfluoroalkyl group containing 1 to 3 carbon atoms), said resin being an agglomeration of colloid particles, wherein said homopolymer or copolymer has a number average primary particle size of 0.05 to 0.5 μm.

4. The high frequency coaxial cable of claim 1, wherein said tetrafluoroethylene resin comprises a first particle having a core-shell structure,
   said particle core being tetrafluoroethylene homopolymer or a copolymer of 99.9 to 99.9999% by mole of tetrafluoroethylene and 0.0001 to 0.1% by mole of hexafluoropropylene or perfluoro(methyl vinyl ether), and said particle shell being a tetrafluoroethylene homopolymer or a copolymer of 99.9 to 99.999% by mole of tetrafluoroethylene and 0.001 to 0.1% by mole of hexafluoropropylene.

5. The high frequency coaxial cable of claim 1, which is obtained by molding the tetrafluoroethylene resin, sintering, and gradually cooling after sintering at a cooling speed of at most 20° C./minute.

6. A printed wiring board made by coating with a molded article of tetrafluoroethylene resin, wherein the molded article is excellent in high frequency electric characteristics and has:
   a dielectric constant of at most 2.2
   and a dielectric dissipation factor of at most $2.0\times10^{-4}$ under 12 GHz,
   and a standard specific gravity of at least 2.192 and less than 2.3.

* * * * *